US010549259B2

United States Patent
Sengupta et al.

(10) Patent No.: US 10,549,259 B2
(45) Date of Patent: Feb. 4, 2020

(54) CARBIDE DERIVED CARBON FOR USE IN CHEMICAL SCRUBBERS

(71) Applicant: BAE SYSTEMS Information and Electronic Systems Integration Inc., Nashua, NH (US)

(72) Inventors: Louise C. Sengupta, Ellicott City, MD (US); Pierre-Alain S. Auroux, Rockville, MD (US); Christopher S. Badorrek, Hagerstown, MD (US); Michael J. Bowers, II, Sykesville, MD (US); Myeongseob Kim, Ellicott City, MD (US); John E. King, Ellicott City, MD (US); Tadd C. Kippeny, Pasadena, MD (US); Laura A. Swafford, Baltimore, MD (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 121 days.

(21) Appl. No.: 15/690,358

(22) Filed: Aug. 30, 2017

(65) Prior Publication Data
US 2019/0060865 A1    Feb. 28, 2019

(51) Int. Cl.
| | | |
|---|---|---|
| *B01D 53/02* | (2006.01) | |
| *B01J 20/20* | (2006.01) | |
| *C01B 32/318* | (2017.01) | |
| *B01J 20/34* | (2006.01) | |
| *B01D 53/04* | (2006.01) | |

(52) U.S. Cl.
CPC ............ *B01J 20/20* (2013.01); *B01D 53/02* (2013.01); *B01D 53/0438* (2013.01); *B01J 20/3483* (2013.01); *C01B 32/318* (2017.08); *B01D 2253/102* (2013.01); *B01D 2253/106* (2013.01); *B01D 2257/204* (2013.01); *B01D 2257/2025* (2013.01); *B01D 2257/2064* (2013.01); *B01D 2257/302* (2013.01); *B01D 2257/304* (2013.01); *B01D 2257/40* (2013.01); *B01D 2257/406* (2013.01); *B01D 2257/704* (2013.01); *B01D 2257/708* (2013.01); *B01D 2257/7022* (2013.01); *B01D 2257/7027* (2013.01); *B01D 2258/06* (2013.01); *B01D 2259/40096* (2013.01); *B01D 2259/4508* (2013.01); *B01D 2259/4541* (2013.01); *B01D 2259/4566* (2013.01); *C01P 2004/02* (2013.01)

(58) Field of Classification Search
CPC .... B01D 2253/102; B01D 2259/40096; B01D 53/0438; B01J 20/20; B01J 20/3483
See application file for complete search history.

(56) References Cited

U.S. PATENT DOCUMENTS

| | | | |
|---|---|---|---|
| 8,365,575 B2 | 2/2013 | Kippeny | |
| 8,833,140 B2 | 9/2014 | Bowers, II et al. | |
| 9,067,848 B2* | 6/2015 | Stadie | .................. C07C 17/389 |
| 9,103,804 B2 | 8/2015 | Badorrek et al. | |
| 9,278,335 B2 | 3/2016 | Sengupta et al. | |
| 9,833,765 B2* | 12/2017 | Mangarella | .............. B01J 20/20 |
| 2012/0073360 A1 | 3/2012 | Hunka et al. | |
| 2014/0017158 A1 | 1/2014 | Sengupta et al. | |
| 2019/0041305 A1 | 2/2019 | Bowers, II et al. | |
| 2019/0060866 A1 | 2/2019 | Bowers, II et al. | |

OTHER PUBLICATIONS

International Search Report, PCT/US2018/049486, dated Nov. 6, 2018, 9 pages.

* cited by examiner

*Primary Examiner* — Sharon Pregler
(74) *Attorney, Agent, or Firm* — Davis & Bujold, PLLC; Scott J. Asmus (57) ABSTRACT

In the method for scrubbing a chemical from a medium, wherein the improvement comprises the steps of using a carbide derived carbon to adsorb the chemical which may later be released by heating. The carbide derived carbon may be a powder, a fiber, a solid foam, a mesh, or other solid form. The carbide derived carbon can adsorb a chemical in the gaseous, liquid, particulate, or aerosol phase.

17 Claims, 6 Drawing Sheets

CARBIDE DERIVED CARBON FOR USE IN CHEMICAL SCRUBBERS

STATEMENT OF GOVERNMENT INTEREST

This disclosure was made with United States Government support under Contract No. HDTRA1-11-C-0013 awarded by the Defense Threat Reduction Agency (DTRA). The United States Government has certain rights in this disclosure.

FIELD OF THE DISCLOSURE

The present disclosure relates to Carbide Derived Carbon (CDC), and more particularly, to its use in chemical scrubbers.

BACKGROUND OF THE DISCLOSURE

Chemical scrubbers remove chemicals from air or water. Typical applications include air filtration, as in building air handling systems (including scrubbers specifically designed to remove toxic chemicals from chemical fume hoods or from toxic chemical-generating industrial processes) or in water filtration (e.g., for aquariums or for personal drinking water). Other applications include air filtration for gas masks or even chemical containment embedded in clothing or other objects (e.g., for soldier protection). Improved chemical scrubbers are, however, still needed.

SUMMARY OF THE DISCLOSURE

One aspect of the present disclosure is a method for chemical scrubbing, comprising providing at least one chemical from a medium; and using a carbide derived carbon (CDC) to adsorb the at least one chemical.

In one embodiment of the method, the carbide-derived carbon can be used in low-humidity environments. In another embodiment of the method, the carbide-derived carbon can be used in high-humidity environments. In yet another embodiment of the method, the carbide-derived carbon can be used in water.

In some cases, the carbide-derived carbon can adsorb a chemical in the gaseous, liquid, particulate, or aerosol phase. In certain embodiments, the carbide-derived carbon can be made from a carbide by the removal of the metal element(s). In some cases, the starting material may be varied in order to tailor the porosity of the carbide-derived carbon to favor adsorption of certain molecules. In other cases, the reaction conditions may be varied in order to tailor the porosity of the carbide-derived carbon to favor adsorption of certain molecules.

In some embodiments of the method, the carbide-derived carbon may be treated post-fabrication in order to enhance adsorption of certain molecules. In some cases, the carbide-derived carbon may be a powder, a fiber, a solid foam, a mesh, or other solid form. In certain cases, the carbide-derived carbon may exist as a lone material or as a skin on the surface of an underlying support structure.

In another embodiment of the method, the carbide derived carbon is heated to release the at least one chemical for purposes of regeneration or analysis. In one embodiment, the at least one chemical is selected from the group consisting of amines, ethers, esters, alcohols, oxides, halogens, sulfides, and aromatic and aliphatic hydrocarbons.

Another aspect of the present disclosure is a system for chemical scrubbing, comprising: a filter comprising a carbide derived carbon; and a medium comprising at least one chemical, wherein the medium contacts the filter and at least one chemical is adsorbed by the filter.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

One aspect of the present disclosure is a highly porous material, carbide-derived carbon (CDC), that spontaneously (without need for power) adsorbs a wide range of chemicals and holds them until a release is triggered by heating the CDC. Remarkably, CDC adsorbs a very broad range of chemicals while simultaneously shedding any water present. As a consequence, CDC can be used in both low- and high-humidity environments, as well as in water. In certain embodiments, the CDC is effective at adsorbing all phases of matter (e.g., gas, liquid, solid particulate, and aerosol). Therefore, CDC is useful as the active material in a chemical scrubber. Because CDC is inexpensive to produce, requires no power to adsorb chemicals, and can be regenerated for additional adsorption (i.e., recycled) by heating, it is a cost-effective means of scrubbing a wide variety of chemicals in a wide variety of applications. This broad applicability is useful in situations where the nature of the chemicals that need to be scrubbed is not known beforehand. One example of this is air treatment in an urban environment where some chemicals (e.g., smog) can be anticipated, while others (e.g., chemicals from a chemical spill or fire) cannot.

In certain embodiments, by varying the starting material and/or reaction conditions, it is possible to tailor the porosity of the CDC to favor adsorption of certain molecules.

In certain embodiments, the CDC may be partially or fully depleted of metal atoms, which also can enhance the adsorption of specific molecules. In certain embodiments, the CDC can be used for the filtration of organic molecules from water. In certain embodiments, the CDC can be used for the filtration of toxic chemicals in gas masks. In certain embodiments, the CDC can be incorporated into fabric for protection against contamination of skin. In certain embodiments, the CDC can be used for the removal of toxic chemicals from the air in chemical (e.g., industrial) processes, environmental air, and/or water filtration. In certain embodiments, CDC based filter media may be used in building or vehicular air systems.

CDC may be tailored to a variety of adsorption tasks by varying the starting material, reaction conditions post treatments or form factors. In certain embodiments, the CDC can be made from any carbide by the removal of the metal element(s). Some examples include, but are not limited to: titanium carbide, iron carbide, molybdenum carbide, cobalt carbide, tungsten carbide, nickel carbide. Different combinations of starting material and reaction conditions make it possible to tailor the porosity of the CDC to favor adsorption of certain molecules.

In certain embodiments, the CDC can be used in a scrubber for chemical hoods. Because hood and scrubber manufacturers typically have no knowledge of what chemicals will be used by the end user, a "universal" sorbent such as CDC is useful. In certain embodiments, the CDC adsorbs all chemicals rather than only a few specific chemicals. CDC has outperformed all commercially available sorbent materials tested to date in terms of adsorbing a wide variety of chemicals in large quantities.

Because not all applications require broad-spectrum adsorption; in certain embodiments, if the CDC is targeting only one or a few chemicals, the CDC's ability to adsorb the target chemical(s) can be enhanced by modifying the conditions of CDC fabrication (e.g., starting material and processing conditions) or by post-fabrication surface treatments. In one embodiment, a post-fabrication acid treatment was used to enhance the ability of CDC to adsorb ammonia gas with the goal of improving the performance of current gas masks.

In certain embodiments, the CDC may be treated post fabrication to enhance adsorption of specific molecules. Post-fabrication treatments include, but are not limited to: plasma treatment, exposure to chemicals or mixtures of chemicals (e.g., hydrogen gas or hydrochloric acid), and attachment of specific chemicals.

In certain embodiments, the CDC may occur in one or a plurality of form factors including but not limited to a powder, a fiber, a solid foam, a mesh, or a solid object. The CDC may exist as a lone material or as a layer on the surface of an underlying support structure.

Because CDC adsorbs chemicals spontaneously, it can be used in situations where power is limited or unavailable, such as in gas masks or clothing. Because it can be made in powder or fiber format, it can be used when there is need for a flexible material (e.g., clothing). Because the CDC of the present disclosure controllably releases chemicals when heated, it can not only be regenerated for further use, but the waste chemicals can be captured in a compact format to minimize waste volume and related costs of disposal. Additionally, because CDC controllably releases chemicals when heated, it could be used to perform analysis of the contaminants originally present in the air or water that was scrubbed.

Figure 1:
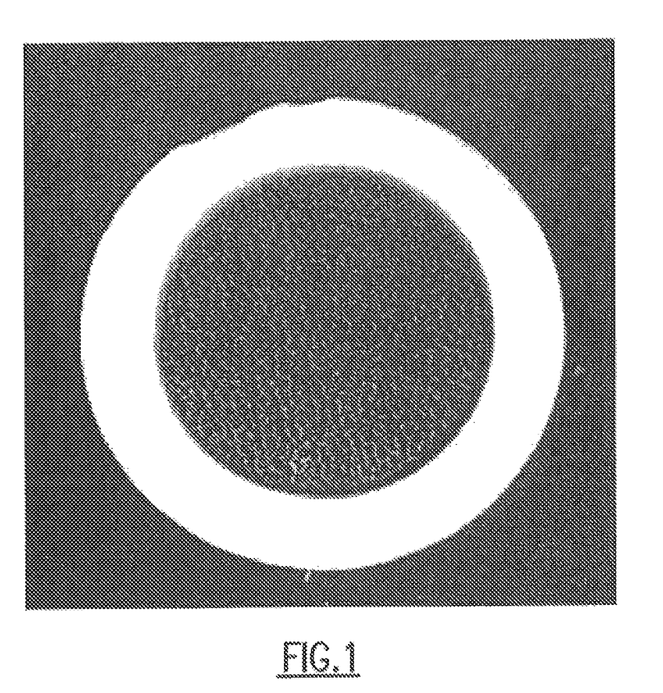
FIG. 1 shows one embodiment of the CDC of the present disclosure on an open cell foam substrate.

Referring to FIG. 1, one embodiment of the CDC of the present disclosure is shown on an open cell foam substrate. More specifically, the CDC comprises a piece of foamed carbide material that has been processed to have a thin layer of carbide-derived carbon on the surface while leaving the carbide skeleton intact. The carbide skeleton serves as a resistive element so that the CDC element is heated directly via current applied through evaporated metal contacts. Passing electrical current through the system allows it to heat rapidly to extremely high temperatures under vacuum.

Figure 2:
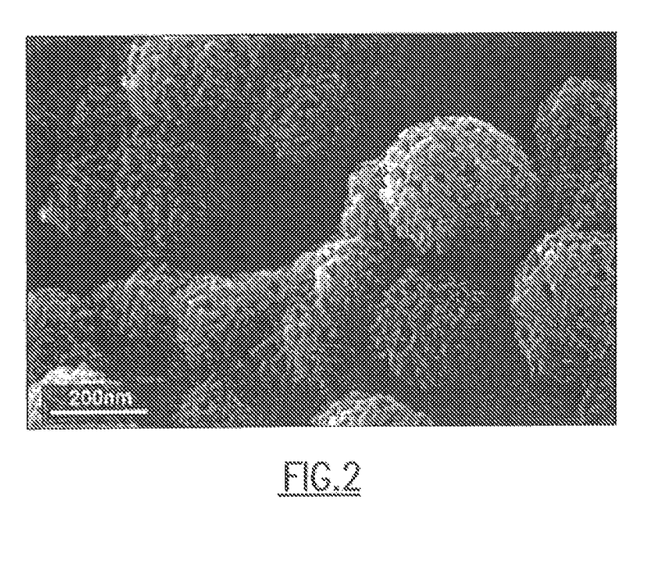
FIG. 2 shows a micrograph of one embodiment of the CDC of the present disclosure.

Referring to FIG. 2, a micrograph of one embodiment of the CDC of the present disclosure is shown. More specifically, the micrograph represents CDC in its powder form, with particulates in a spherical shape and ~200 nanometers in diameter.

Figure 3:
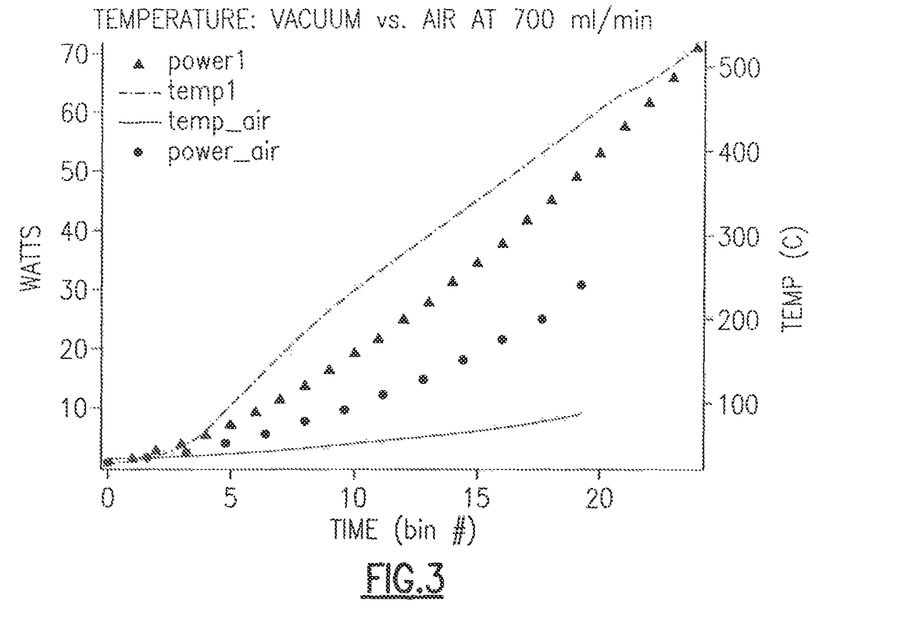
FIG. 3 shows a comparison of heating under vacuum (top two traces) and flowing air (bottom two traces) with one embodiment of the CDC of the present disclosure.

Referring to FIG. 3, a comparison of heating under vacuum (top two traces) and flowing air (e.g., 700 cc/min of air) (bottom two traces) with one embodiment of the CDC of the present disclosure is shown. The difference in the power curve results from the properties of the carbide heating element. Being a semiconductor, as the temperature increases, the resistivity decreases allowing more current to be pushed through the system and hence a higher power. Another issue is the stability of the metal contacts (copper) in air. After several runs, the contacts may degrade and the resistance of the system may rise until the piece is not serviceable.

In one embodiment, test data were collected on two different versions of quadrapole mass spectrometers utilizing the same CDC medium. Initial testing was performed on a direct desorption mass spectrometer based on a residual gas analyzer (RGA). The system was automated to take vapor samples for a predetermined sampling time via logic controller and operated via a single push button. Data was collected via a laptop computer through a software program that controlled the RGA. In one embodiment, the heating control of the CDC element was established via crude pulse width modulation by switching a variable voltage power supply on and off.

In certain embodiments, data was collected using a RGA-based instrument with one embodiment of the CDC of the present disclosure. More specifically, a mixture of dichloromethane, isopropanol and mesitylene at approximately 100 ppb in air was analyzed. In certain embodiments, the crude heating control provides some degree of separation of the analytes, which is related to the boiling points of the analytes. Other mixtures were measured with similar results. The instrument was later fitted with a separate control unit that provided a controlled temperature ramp via a DC motor controller utilizing fast switching pulse-width modulation (PWM).

In one embodiment, the CDC/MS system was based on the same CDC element described above but coupled to an Agilent 5975 MSD. The MSD which would normally be connected to a gas chromatograph (GC) was operated as a stand-alone unit simply by creating a new instrument with the ChemStation configuration utility that did not include a GC in the profile. In certain embodiments, the control of the instrument was then established via Agilent ChemStation software that is standard equipment for most Agilent instruments. The CDC element control was designed to operate like a sampling module for the Agilent instrument. Communication was via the remote cable from the Agilent instrument. This was convenient when taking vapor samples using these configurations, data collection was completely automated via ChemStation Sequences as the pre-concentrator was triggered to sample by the MSD and then in turn started the MSD method via remote start.

In one embodiment, the instrument was powered by a single 120 VAC supply cable and was fused. Internally, all the systems were driven by a pair of DC power supplies at 12 and 24 VDC, respectively. The 24 VDC supply provided power to the PLC controller, as well as the pre-concentrator valves and other internal components. The 12 VDC power supply provided power for the DC motor control which provided the power for heating the CDC. In certain embodiments, the system required two inputs for automated operation. A ready signal and a remote start signal. This was connected to the CDC via a DB9 connector near the CDC element head. The CDC head was then connected via a single DB15 cable to the control box providing a clean interface. In certain embodiments, the breadboard system was controlled by a standard Eaton EZ820-DC-RC "smart relay" with EZ619 expansion module. This provided integrated PLC control and relays with an easy programming platform (ladder logic) for rapid prototyping and design changes with minimal software issues. It also provided an extremely stable and solid OS for the imbedded CDC control. This particular series of "smart relays" had a 0-10 VDC analog transistor output along with the standard 0-10 VDC analog inputs. This allowed for fine control over heating of the CDC so that the desired temperature ramp can be achieved.

In one embodiment, the transistor output lacked the power to directly drive the heating of the CDC so a DC motor control board and isolator (Dart Controls) was employed. The motor controller used pulse width modulation (PWM) to control the average voltage (power) to the motor or in this case the CDC. This allowed fine control of the CDC heating profile. The motor control also provided current limiting to minimize chances of damaging the CDC element should a malfunction occur or an error in the ramp profile be made inadvertently. This limit was set at 22-25 W, but the CDC element was tested to much higher powers for short periods of time. The isolation board was required to allow the motor control board to be controlled via the 0-10 VDC signal from the PLC controller.

Like with most heating elements, there was some variability in the heating element resistance from piece to piece. To automatically compensate for that, the program was designed to correct the input voltage to provide the same power profile (and in principle the same heating profile) regardless of the heating element resistance. This was accomplished by monitoring the current and voltage drop across the heating element for a measurement of power and correcting via PID control. The voltage was measured directly by the controller while the current was measured via a Hall Effect current transducer.

In certain embodiments, the current iteration provides for several different modes. The default is vapor/aerosol collection and analysis. The collection time was selectable via the software but defaulted to 300 seconds. By flipping a toggle switch, the instrument was used for liquid injections via the septum port on the pre-concentrator head much like would be found on a standard GC. The system was also put in a "stand by" mode so that the instrument could be run independent of the CDC to afford flexibility to the user.

In another embodiment, vapor testing was carried out by providing a challenge mixture to the CDC followed by analysis. Challenge mixtures were generated either by dilution of custom gas mixtures in gas cylinders or via permeation oven. Mixture base concentrations were verified based on gas injection into a cryo-cooled GC/MS system which was previously used to produce liquid calibration curves. Stimulants chosen were dimethyl,methylphosphonate (DMMP), methyl salicylate (MeS), diethylmalonate (DEM), tris (2-chloroethyl) phosphate (TCEP) and triethylphosphate (TEP).

In one embodiment, the sampling time was varied from 30 seconds to 5 minutes, with the latter being required to reach parts-per-trillion levels of concentration. The sampling rate was approximately 2.5 LPM indicating a severe flow restriction in the system which could indicate the Clippard valves or possibly the CDC element. A summary of the detected stimulants is shown in Table 1.

TABLE 1

| Compound | Detected (yes/no) | Concentration | Notes |
|---|---|---|---|
| dimethylmethylphosphonate | Yes | 1 ppb | |
| Diethylmalonate | Yes | 2.8 ppb | Protonated form |
| Tris-(2-chloroethyl)phosphate | No | 6 ppb | Detected as $SO_2$ by oxidation |
| Triethylphosphate | Yes | ~10 ppb | Concentration estimated based on other analytes |

The trend in this data set was that the heavier compounds proved more difficult to detect. The two possible causes for this are that the CDC was not adsorbing the analytes or the CDC was not desorbing the analytes. Break-through studies have shown that the analytes were being adsorbed by the CDC meaning that they were not being efficiently released to the mass spectrometer. In one embodiment, switching to a thinner medium drastically improved desorption while balancing collection efficiency. In certain embodiments, changing the orientation of gas flow paths, so that collection occurs on the long axis and desorption can occur along a shorter axis, was done.

In one embodiment, several TICs (Toxic Industrial Chemicals) were tested. The chemicals listed in Table 2 were tested using disposable permeation tubes in a KinTek permeation tube oven with compressed air as the dilution gas. Detection was determined via SIM traces. SIM traces of two ions for a given compound were overlaid. The ions had similar shapes and the correct relative abundances, and it was concluded that the ions belonged to the challenge compound. This was further confirmed by a concentration series. Concentrations of the challenge analytes were varied and changes in the response of the ion peaks noted. (See, Table 2).

TABLE 2

| Compound | Detected (yes/no) | Concentration | Notes |
|---|---|---|---|
| Chlorine | No | 3.5 ppm | |
| Phosgene | Yes | 90 ppb | Protonated form |
| Hydrogen Sulfide | Yes | 20 ppb | Detected by $SO_2$ by oxidation |
| Nitric Acid | No | 65 ppb | |

TABLE 2-continued

| Compound | Detected (yes/no) | Concentration | Notes |
|---|---|---|---|
| Sulfur Dioxide | Yes | 1.6 ppb | |
| Ammonia | Yes | 800 ppb | |

In one embodiment, liquid samples were handled via a septum injection port on the top of the CDC head. The CDC then acted much like a heated inlet used on a GC instrument. Liquid samples were prepared using the same methodologies that were used when preparing liquid GC samples for analysis. A low boiling solvent was used so that the bulk of the solvent could be pumped off prior to analysis of the sample. Samples ranged from 1000 to 10 μg/mL. Solvents with simple MS spectra were preferred to minimize solvent suppression and simplify data interpretation. (See, Table 3).

TABLE 3

| Compound | Detected (yes/no) | Concentration | Notes |
|---|---|---|---|
| DMMP | Yes | 10 μg/mL | 1 μL injection |
| Diethylmalonate | Yes | 10 μg/mL | 1 μL injection |
| Tris-(2-chloroethyl)phosphate | Yes | 100 μg/mL | 1 μL injection |
| Methyl salicylate | Yes | 10 μg/mL | 1 μL injection |

In one embodiment, CDC was used to extract analytes from water samples. In one embodiment, aqueous solutions containing diisopropyl methylphosphonate (DIMP) were prepared. 60 mL of solution was passed through CDC via gravity filtration. The CDC was then raised to approximately 60° C. for 30 min with 5 liters/min nitrogen flow to remove the water. DIMP was detected clearly at a concentration of 100 ppm but was not detected at 1 ppm indicating that the detection limit for this set of experimental conditions was between 1 and 100 ppm. Given the size of the signal detected at 100 ppm one estimate for detection would be between 20 and 50 ppm.

Figure 4:
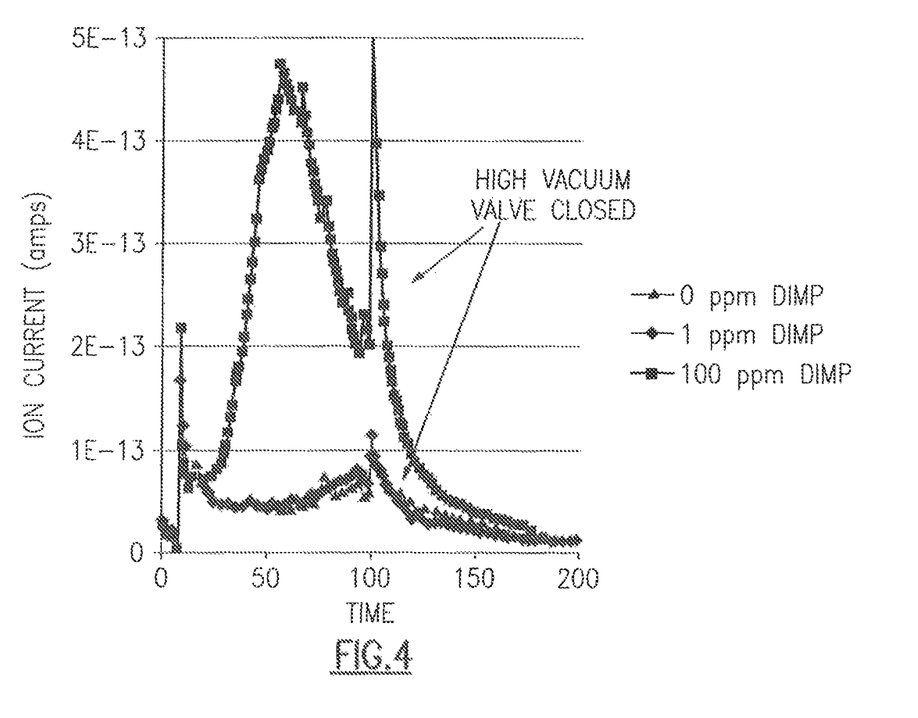
FIG. 4 shows a plot of data collected from a water analysis experiment using one embodiment of the CDC of the present disclosure.

Referring to FIG. 4, a plot of data collected from a water analysis experiment with the RGA based MS system using one embodiment of the CDC of the present disclosure is shown. More specifically, diisopropyl methylphosphonate (DIMP) was detected at a concentration of 100 ppm but was not detected at 1 ppm. One estimate for detection would be between 20 and 50 ppm.

In certain embodiments, the carbide derived carbon is used to adsorb the at least one chemical wherein the at least on chemical includes amines, ethers, esters, alcohols, oxides, halogens, sulfides, and aromatic and aliphatic hydrocarbons, and the like. In certain embodiments, hydrocarbons include, but are not limited to propane, 1-butene, butane, 2-butene, 2-methylbutane, 1-pentene, pentane, 2-pentene, 2,2-dimethylbutane, 2,3-dimethylbutane, 2-methylpentane, 3-methylpentane, 1-hexene, hexane, 2,4 dimethylpentane, methylcyclopentane, benzene, 2,3-dimethylpentane, 3-methylhexane, 2,2,4-trimethylpentane, 2-methylheptane, toluene, 3-methylheptane, octane, ethylbenzene, m/p-xylene, nonane, styrene, o-xylene, cumene, propylbenzene, p-ethyltoluene, 1,3,5,-trimethylbenzene, 1,2,3,-trimethylbenzene, decane, 1,2,4,-trimethylbenzene, m-diethylbenzene, p-ethylbenzene, undecane, 1,3-diethylbenzene, dodecane, ethyl ether, 2-methylpropanal, cyclopentene, vinyl acetate, 2-methyl-2-pentene, acetonitrile, 1,2-dichloroethane, 1-chloropentane, ethyl isobutyrate, n-propyl acetate, ethyl benzene, cyclohexanone, a-pinene, benzaldehyde, hexamethyldisiloxane, 2,3-butanedione, acrylonitrile, 4-methy-2-pentanone, 2-butanone, methyl acrylate, 4-vinylcyclohexene, trichloroethene, 3-carene, toluene, 1,2-dichlorobenzene, amyl acetate, and the like.

Figure 5:
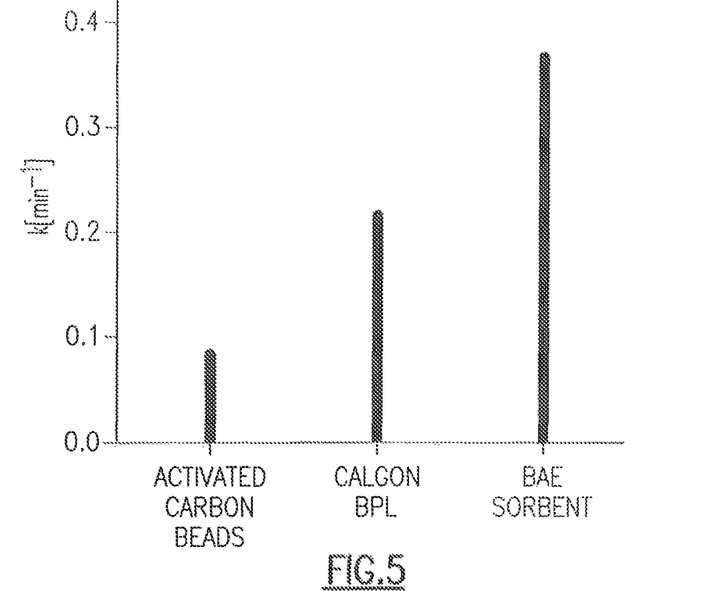
FIG. 5 shows the high mass transfer coefficient of one embodiment of the CDC of the present disclosure compared to other materials.

Referring to FIG. 5, the high mass transfer coefficient of one embodiment of the CDC of the present disclosure compared to other materials is shown. More specifically, one embodiment of the CDC of the present disclosure is shown to have a higher mass transfer coefficient than Calgon BPL and activated carbon beads allowing for faster sampling rates (L/min).

Figure 6:
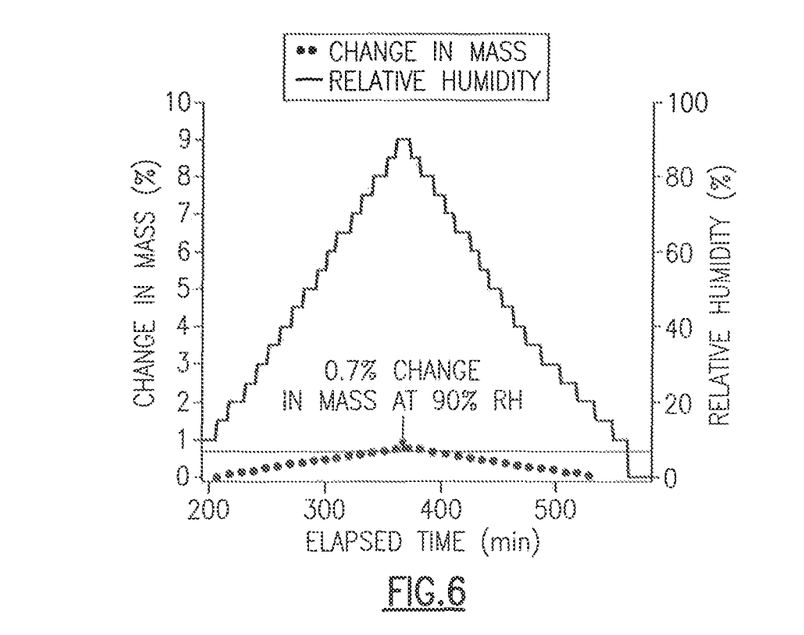
FIG. 6 shows the water rejection capability of one embodiment of the CDC of the present disclosure.

Referring to FIG. 6, the water rejection capability of one embodiment of the CDC of the present disclosure is shown. More specifically, one embodiment of the CDC of the present disclosure is shown to have a high water rejection capability and very little water adsorption over time.

Figure 7:
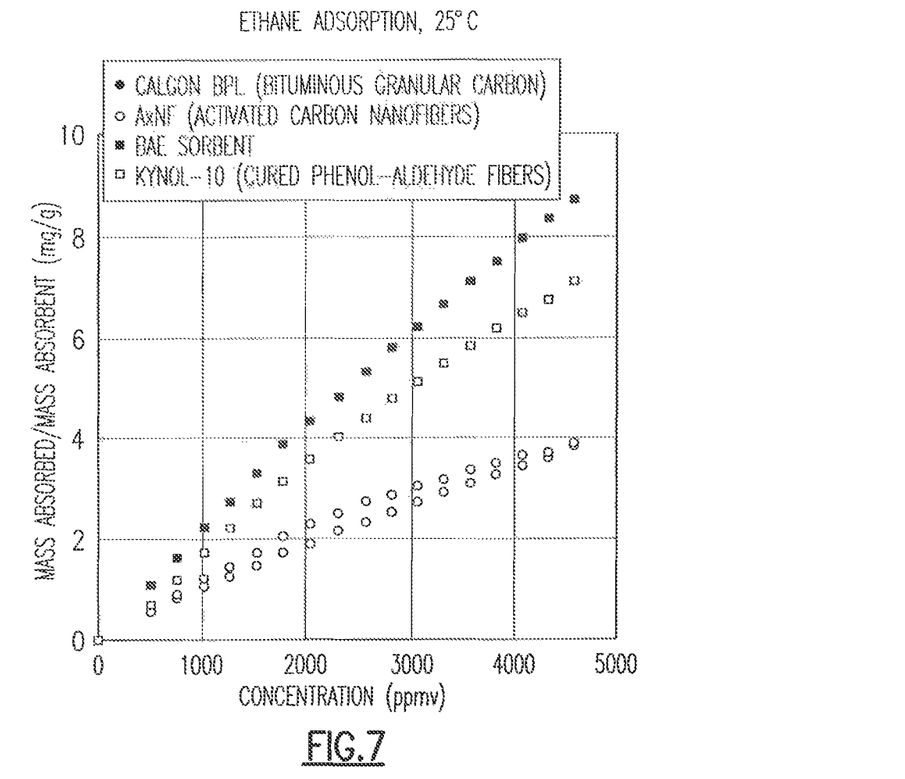
FIG. 7 shows enhanced adsorption of chemicals using one embodiment of the CDC of the present disclosure.

Referring to FIG. 7, enhanced adsorption of chemicals using one embodiment of the CDC of the present disclosure is shown. More specifically, one embodiment of the CDC of the present disclosure is shown to have enhanced adsorption of hard-to-capture chemicals, like ethane, when compared to other materials. Other chemicals of interest for certain applications might include methyl tertbutyl ether (MTBE), benzene, toluene, tris 2-chloroethyl phosphate (TCEP) and other tris phosphate chemicals, perfluorooctanoic acid (PFOA), and the like. In certain embodiments, non-optimized CDC was tested.

Figure 8:
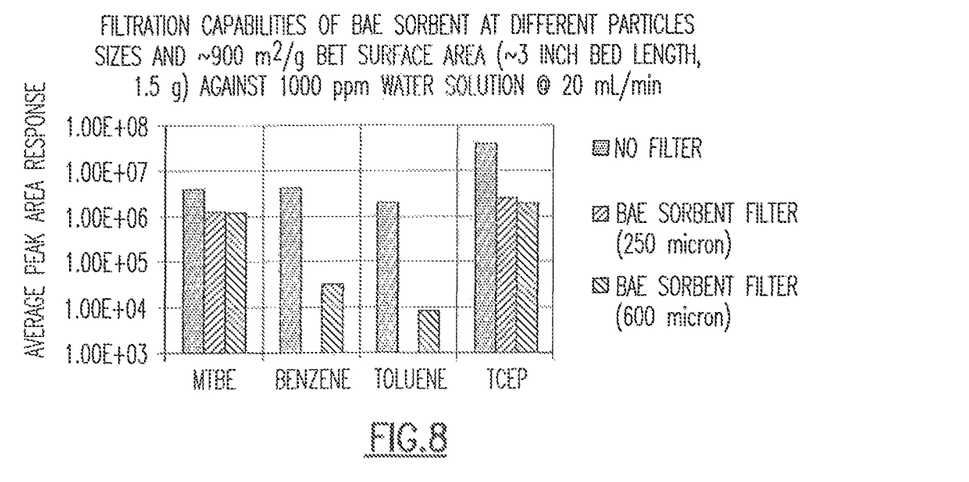
FIG. 8 shows results of one filtration study using one embodiment of the CDC of the present disclosure.

Referring to FIG. 8, results of one filtration study using one embodiment of the CDC of the present disclosure is shown. More specifically, embodiments of the CDC of the present disclosure are shown to filter chemicals from water. In one embodiment, sorbent samples were loaded into a CAMSCO fast flow tube (~3 inches is typical bed length for COTS water filters), where the sorbent was CDC. In certain embodiments, about 50 mL of 1000 ppm water source was filtered through sorbent sample @ 20 mL/min using automated syringe injector system. Filtered water was then subjected to 3×10 mL solvent extractions with dichloromethane (DCM). 2 mL of DCM extract was injected onto GC-MS for analysis of any residual chemicals. One embodiment of the CDC material of the present disclosure demonstrated the capability to reduce the concentrations of the chemicals within a water sample.

In certain embodiments, COTS sorbents that were included in the study were Brita (mixture of activated carbon and small green ion exchange resin beads) and activated carbon from Platypus Gravityworks. About 50 mL of 1000 ppm water source was filtered through sorbent samples @ 20 mL/min using automated syringe injector system.

Figure 9:
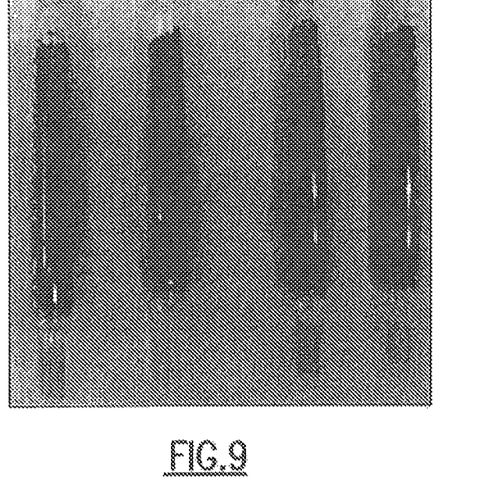
FIG. 9 shows a photograph of various sorbent materials including embodiments of the CDC of the present disclosure.

Referring to FIG. 9, a photograph of various sorbent materials including embodiments of the CDC of the present disclosure is shown. More specifically, 1=250 micron CDC, 2=600 micron CDC, 3=Brita filter sorbent, and 4=activated carbon filter from Platypus Gravityworks. Filtered water was subjected to 3×10 mL solvent extractions with dichloromethane (DCM). 2 mL of DCM extract was injected onto GC-MS for analysis of any residual chemicals.

Figure 10:
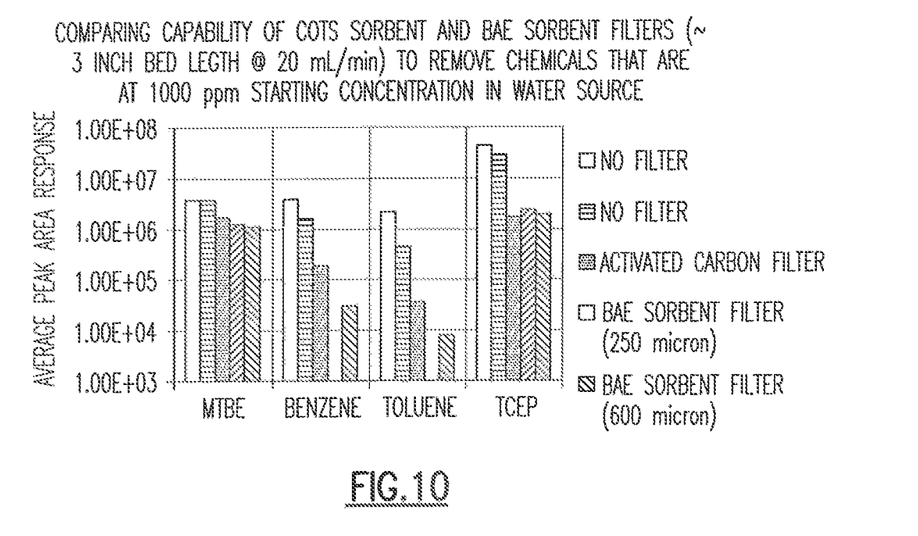
FIG. 10 shows results of one filtration study using one embodiment of the CDC of the present disclosure.

Referring to FIG. 10, results of the filtration study using one embodiment of the CDC of the present disclosure is shown. More specifically, non-optimized CDC material demonstrated similar or better chemical filtration capabilities from water as gold standard activated carbon sorbent.

Figure 11:
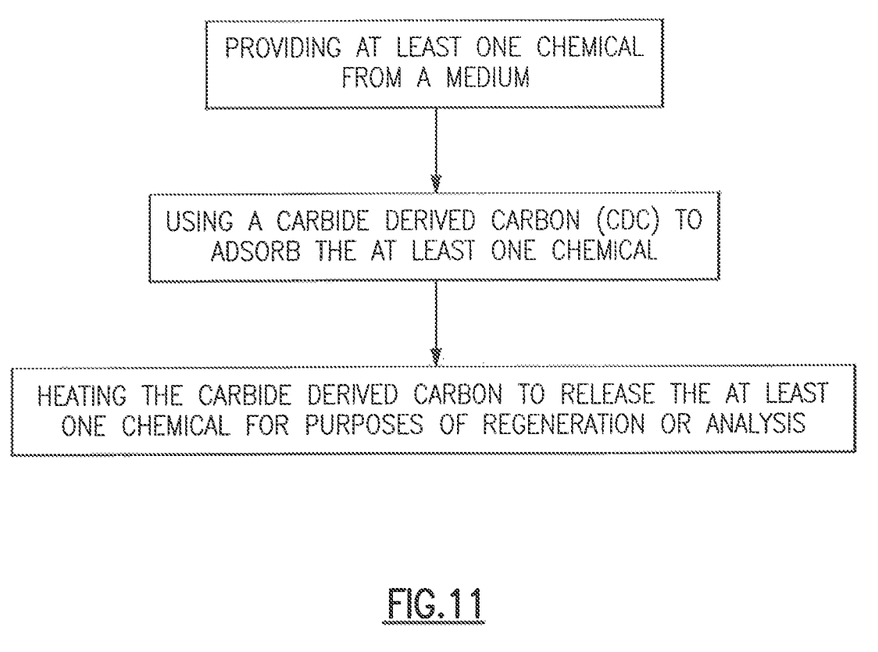
FIG. 11 shows a flowchart of one embodiment of the method of chemical scrubbing according to the principles of the present disclosure.

Referring to FIG. 11, a flowchart of one embodiment of the method of chemical scrubbing according to the principles of the present disclosure is shown. While various embodiments of the present disclosure have been described in detail, it is apparent that various modifications and alterations of those embodiments will occur to and be readily apparent to those skilled in the art. However, it is to be expressly understood that such modifications and alterations are within the scope and spirit of the present disclosure, as set forth in the appended claims.

Further, the disclosure(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method for chemical scrubbing, comprising
   providing at least one chemical from a gaseous, liquid, particulate, or aerosol phase;
   using a carbide-derived carbon (CDC) to adsorb the at least one chemical;
   tailoring the porosity of the CDC to favor adsorption of the at least one chemical; and
   heating the carbide-derived carbon (CDC) to release the at least one chemical, thereby regenerating the CDC.

2. The method of claim 1, wherein the carbide-derived carbon is used in low-humidity environments.

3. The method of claim 1, wherein the carbide-derived carbon is used in high-humidity environments.

4. The method of claim 1, wherein the carbide-derived carbon is used in water.

5. The method of claim 1, wherein the carbide-derived carbon is made from a carbide by the removal of the metal element(s).

6. The method of claim 1, wherein the starting material is varied in order to tailor the porosity of the carbide-derived carbon to favor adsorption of the at least one chemical.

7. The method of claim 1, wherein the reaction conditions are varied in order to tailor the porosity of the carbide-derived carbon to favor adsorption of the at least one chemical.

8. The method of claim 1, wherein the carbide-derived carbon is a powder, a fiber, a solid foam, a mesh, or solid.

9. The method of claim 1, wherein the carbide-derived carbon is a lone material or a skin on the surface of an underlying support structure.

10. The method of claim 1, wherein the carbide-derived carbon is disposed within a filter.

11. The method of claim 1, wherein the at least one chemical is selected form the group consisting of amines, ethers, esters, alcohols, oxides, halogens, sulfides, and aromatic and aliphatic hydrocarbons.

12. A system for chemical scrubbing, comprising:
    a filter comprising a carbide-derived carbon (CDC); and
    a gaseous, liquid, particulate, or aerosol phase comprising at least one chemical, wherein the gaseous, liquid, particulate, or aerosol phase contacts the filter and at least one chemical is adsorbed by the filter;
    wherein the CDC is configured to be heated to release the at least one chemical so the CDC is regenerated and wherein the CDC comprises a tailored porosity to favor adsorption of the at least one chemical for the chemical scrubbing.

13. The system for chemical scrubbing according to claim 12, wherein the at least one chemical is selected from the group consisting of amines, ethers, esters, alcohols, oxides, halogens, sulfides, and aromatic and aliphatic hydrocarbons.

14. The system for chemical scrubbing according to claim 12, wherein the carbide-derived carbon is a powder, a fiber, a solid foam, a mesh, or solid.

15. The system for chemical scrubbing according to claim 12, wherein the carbide-derived carbon is a lone material or a skin on the surface of an underlying support structure.

16. The system for chemical scrubbing according to claim 12, wherein the carbide-derived carbon is disposed within a filter.

17. The system for chemical scrubbing according to claim 12, wherein the carbide-derived carbon is used in water.

* * * * *